P. J. ERNENWEIN.
RUBBER TIRE.
APPLICATION FILED DEC. 12, 1910.
1,106,701.  Patented Aug. 11, 1914.
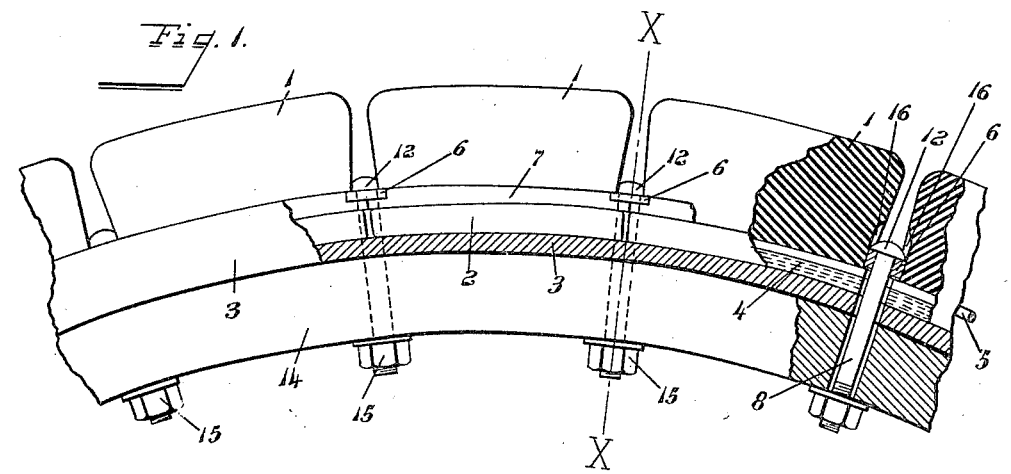
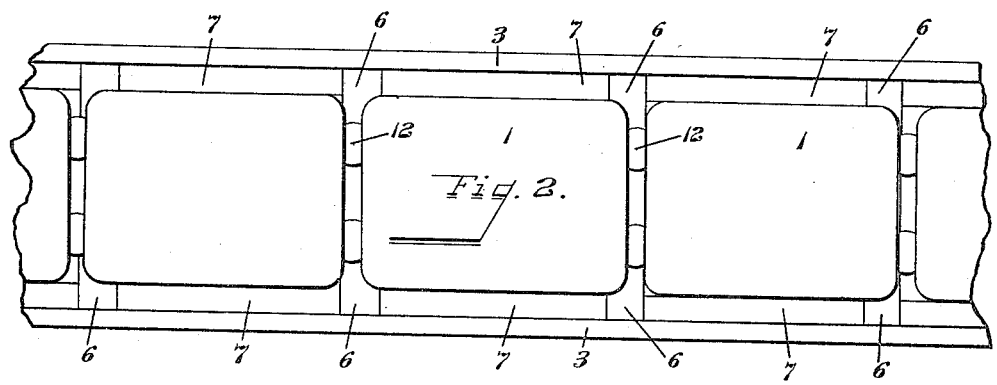
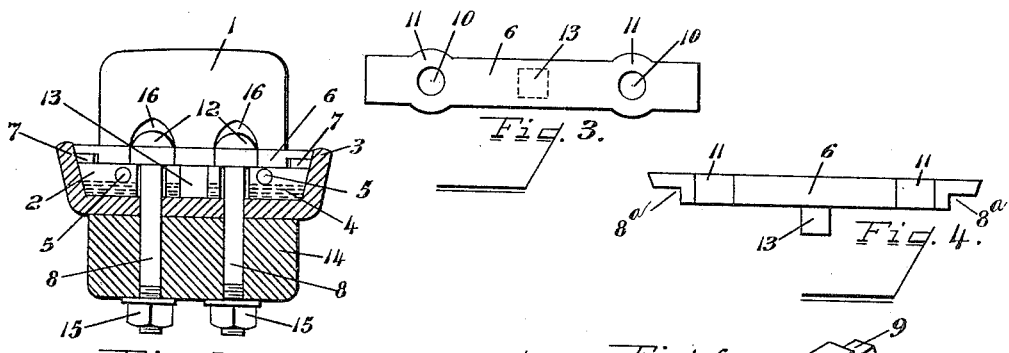
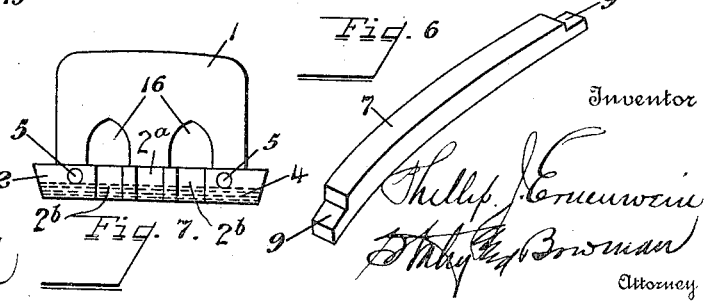

UNITED STATES PATENT OFFICE.

PHILLIP J. ERNENWEIN, OF NEW YORK, N. Y., ASSIGNOR TO KELLY-SPRINGFIELD TIRE COMPANY, OF JERSEY CITY, NEW JERSEY, A CORPORATION OF NEW JERSEY.

RUBBER TIRE.

1,106,701.  Specification of Letters Patent.  Patented Aug. 11, 1914.

Application filed December 12, 1910. Serial No. 596,823.

*To all whom it may concern:*

Be it known that I, PHILLIP J. ERNENWEIN, a citizen of the United States, residing at the city of New York, in the borough of Manhattan and State of New York, have invented certain new and useful Improvements in Rubber Tires, of which the following is a specification.

My invention relates to improvements in rubber tires, especially adapted for use on heavy vehicles, and it particularly relates to the type of tires described in the prior patents of Frank E. Hall No. 604,042, dated May 17th, 1898 and No. 671,549, dated July 19th, 1901. Difficulty has been experienced with the tire set forth in said patents in retaining the rubber tire upon the wheel felly when subjected to severe use, and the particular object herein is to improve the efficiency of tires of this kind and to also provide for readily repairing or renewing the tires.

The invention consists in the constructions and combinations of parts as hereinafter described and set forth in the claims.

In the accompanying drawings: Figure 1 is a side elevation of a portion of the rim or felly of a vehicle wheel with my improved tire applied thereto, some of the parts being broken away and shown in section. Fig. 2 is a top plan view of the same. Figs. 3 and 4 are detail views of one of the cross-bars that form part of the securing devices. Fig. 5 is a vertical section on the line $x-x$ of Fig. 1. Fig. 6 is a detail of one of the side bars also forming part of the securing devices. Fig. 7 is an end view of one of the rubber blocks.

Like parts are represented by similar characters of reference in the several views.

The tire proper consists of a series of blocks or sections of rubber, each section consisting of a tread portion 1 and a base portion 2. The base portion 2 is wider and longer than the tread portion 1 so as to form flanges on all sides of the section. This base portion is preferably so shaped as to conform to the metallic channel 3 which preferably has flaring flanges. The base portion is also preferably reinforced by fabric 4 and may have one or more longitudinal wires 5 to further stiffen and strengthen the same. The tread portion 1 is considerably longer at its outer periphery than at the point where it joins the base for the purpose more fully described hereinafter. The devices for securing these blocks of rubber in the channel consist of cross-bars 6, side-bars 7 and bolts 8. The respective ends of each of the cross-bars and side-bars are offset or shouldered as indicated at 8 and 9 so they may be readily fitted to ecah other. Each of the cross-bars 6 is perforated near its respective ends as indicated at 10 to receive the bolts 8 and is also enlarged at 11 about its bolt holes so as to accommodate the heads 12 of the bolts. Each cross-bar is also provided at its center with a projecting support 13 which, when the parts are assembled, will rest upon the channel 3 as shown in Fig. 5; the adjacent ends of the respective sections of rubber being recessed as shown at $2^a$ to accommodate this support 13. The respective bases of the rubber blocks are also recessed as indicated at $2^b$ to accommodate the securing bolts 8; the metallic channel 3 and felly 14 being provided with perforations to permit the passage therethrough of said bolts which are secured in position by the nuts 15. In tires of this type, where the rubber is constructed in sections, it is highly desirable that the outer peripheries of the respective sections of rubber be brought as close together as possible so as to provide in effect a continuous tread. At the same time it is necessary to provide for accommodating, between each section of rubber, those parts of the securing device which in the present case are represented by the cross-bars 6. By forming the outer periphery of the blocks 1, therefore, longer than that part thereof that joins the base 2 and also recessing the base as described, I have provided for accommodating these cross-bars and the securing devices, but at the same time forming a tread that will be practically continuous under load. In order that the blocks 1, at the point where they join the base 2 may not be unduly weakened, I have constructed the main portion of these cross-bars as narrow as practical, which I have found may be considerably less than the diameter of the bolt heads, and have enlarged the bars as previously described to accommodate the bolt heads, the ends of the blocks 1 being recessed as indicated at 16 to receive the enlarged portions of the bars and the said bolt heads, these recesses together with the recesses in the base permitting the blocks to be brought closer together. It will be observed that the recesses 16 extend only part way between the base and the tread, so that the recesses will not show or cannot be noticed on the tread of the rubber. In inserting these cross-bars and bolts in position, the outer periphery of the outer blocks, 1, will simply be pressed back to permit the passage therebetween of the cross-bars and heads, the elasticity of the rubber permitting for this. By providing the supports 13 on the cross-bars 6, located at their centers and between the respective bolt holes, means are provided for strengthening the cross-bars to prevent straining or bending of the same. These supports further tend to prevent any undue compression on the bases of the blocks and permit the sections to be secured to the wheel in a more uniform manner.

Having thus described my invention, I claim:

1. In a rubber tire for vehicle wheels, the combination of a rigid channel member having outwardly projecting flanges, a rubber tire formed of a series of blocks, each of said blocks having end and side projecting base portions, longitudinal and transverse holding members extending across said base portions and bearing on the top surfaces thereof, means projecting from said transverse members for securing said members to the wheel, and a central projection extending from each of said transverse members and bearing against the bottom of said channel, the end base portions of adjacent blocks being recessed to receive said central projections.

2. In a sectional rubber tire for vehicle wheels, the combination of a channel rim, a series of blocks of rubber, each block consisting of a tread portion and extending side and end base portions, securing devices consisting of longitudinal and transverse strips supported on the outer surface of said base portions, the adjacent end base portions of the respective blocks having oppositely disposed recesses, means for securing said strip to the wheel of the vehicle, and means projecting from said projecting transverse strip through said recesses and resting upon the bottom of the channel for forming a rigid support for said transverse strip.

In testimony whereof, I have hereunto set my hand this 6th day of December 1910.

PHILLIP J. ERNENWEIN.

Witnesses:
E. S. ROBERTS,
CHAS. P. STEWART.

---

Copies of this patent may be obtained for five cents each, by addressing the "Commissioner of Patents, Washington, D. C."